United States Patent
Cieslak et al.

(10) Patent No.: US 11,593,517 B1
(45) Date of Patent: *Feb. 28, 2023

(54) SYSTEMS AND METHODS FOR A VIRTUAL FRAUD SANDBOX

(71) Applicant: Wells Fargo Bank, N.A., San Francisco, CA (US)

(72) Inventors: Kevin R. Cieslak, Novato, CA (US); Jeffrey A. Cornman, San Francisco, CA (US); Chris Kalaboukis, San Jose, CA (US); Ramanathan Ramanathan, Bellevue, WA (US); Darrell L. Suen, San Ramon, CA (US); Christina M. Zappala, Burlingame, CA (US)

(73) Assignee: Wells Fargo Bank, N.A., San Francisco, CA (US)

(*) Notice: Subject to any disclaimer, the term of this patent is extended or adjusted under 35 U.S.C. 154(b) by 67 days.

This patent is subject to a terminal disclaimer.

(21) Appl. No.: 17/354,221

(22) Filed: Jun. 22, 2021

Related U.S. Application Data

(63) Continuation of application No. 16/589,748, filed on Oct. 1, 2019, now Pat. No. 11,048,818, which is a continuation of application No. 15/498,331, filed on Apr. 26, 2017, now Pat. No. 10,474,836.

(51) Int. Cl.
| | | |
|---|---|---|
| *G06F 21/62* | (2013.01) | |
| *H04L 29/06* | (2006.01) | |
| *G06Q 40/02* | (2012.01) | |
| *H04L 9/40* | (2022.01) | |

(52) U.S. Cl.
CPC ......... *G06F 21/6245* (2013.01); *G06Q 40/02* (2013.01); *H04L 63/083* (2013.01); *H04L 63/101* (2013.01); *H04L 63/1483* (2013.01)

(58) Field of Classification Search
CPC ..... G06F 21/6245; G06F 21/62; G06Q 40/02; H04L 63/083; H04L 63/101; H04L 63/1483; H04L 29/06
See application file for complete search history.

(56) References Cited

U.S. PATENT DOCUMENTS

| | | |
|---|---|---|
| 7,698,442 B1 | 4/2010 | Krishnamurthy et al. |
| 7,802,298 B1 | 9/2010 | Hong et al. |
| 8,813,239 B2 | 8/2014 | Tibeica et al. |

(Continued)

*Primary Examiner* — Quazi Farooqui
(74) *Attorney, Agent, or Firm* — Foley & Lardner LLP

(57) ABSTRACT

A financial institution computing system associated with a financial institution includes a network interface configured to communicate data over a network, and a processing circuit comprising a memory and a processor. The memory has instructions stored thereon that cause the processor to receive, by the network interface, a content request from a user computing device associated with a user, the content request requesting content from a network destination, determine if the network destination is associated with a trusted entity, determine that the requested content prompts the user to input sensitive information, and transmit, by the network interface substitution content to the user computing device responsive to determining that the network destination is illegitimate and to determining that the requested content includes at least one field into which the user may input sensitive information, the substitution content including at least one prompt requesting the user to input sensitive information.

20 Claims, 3 Drawing Sheets

(56) References Cited

U.S. PATENT DOCUMENTS

| | | |
|---|---|---|
| 8,826,400 B2 | 9/2014 | Amaya Calvo et al. |
| 8,850,567 B1 | 9/2014 | Hsieh et al. |
| 8,996,697 B2 | 3/2015 | Pugh |
| 9,002,750 B1 | 4/2015 | Chu et al. |
| 9,021,583 B2 | 4/2015 | Wittenstein et al. |
| 9,027,128 B1 | 5/2015 | Oliver et al. |
| 9,038,181 B2 | 5/2015 | Gerber et al. |
| 9,166,971 B1 | 10/2015 | Emigh |
| 9,356,947 B2 | 5/2016 | Shraim et al. |
| 2007/0261112 A1 | 11/2007 | Todd et al. |
| 2008/0172738 A1 | 7/2008 | Bates et al. |
| 2009/0089859 A1 | 4/2009 | Cook et al. |
| 2011/0107190 A1 | 5/2011 | Henderson et al. |
| 2014/0331119 A1* | 11/2014 | Dixon .................... G06Q 30/02 715/234 |

\* cited by examiner

SYSTEMS AND METHODS FOR A VIRTUAL FRAUD SANDBOX

CROSS-REFERENCE TO RELATED APPLICATIONS

This application is a continuation of U.S. patent application Ser. No. 16/589,748, titled "SYSTEMS AND METHODS FOR A VIRTUAL FRAUD SANDBOX," filed on Oct. 1, 2019, which is a continuation of U.S. patent application Ser. No. 15/498,331, titled "SYSTEMS AND METHODS FOR A GENERATED FRAUD SANDBOX," filed on Apr. 26, 2017, now U.S. Pat. No. 10,474,836 issued Nov. 12, 2019, the entireties of which are incorporated herein by reference.

BACKGROUND

There are many potential traps for the unwary on the internet. For example, various fraudulent schemes exist that are designed to extract valuable, sensitive information from users. For example, so called "phishing expeditions" involve a user receiving an illegitimate e-mail message that is arranged to pass itself off as a message from a legitimate entity (e.g., a merchant, financial institution, government entity). Such e-mails may lure individuals into clicking a hyperlink or the like to an illegitimate website. The website may request private information from the user. If the user enters the requested information, such information may be used in ways that are quite harmful to the user (e.g., opening up a fraudulent bank account). Thus, it would be beneficial to prevent such information from being provided to fictitious entities and to educate users to avoid such occurrences.

SUMMARY

One embodiment relates to a financial institution computing system associated with a financial institution. The financial institution computing system includes a network interface configured to communicate data over a network. The financial institution computing system also includes a network database configured to store information pertaining to a plurality of legitimate network destinations associated with a plurality of trusted entities and a plurality of fraudulent network destinations. The financial institution computing system also includes a processing circuit comprising a memory and a processor, the memory structured to store instructions that are executable by the processor to cause the processor to receive, by the network interface, a content request from a user computing device associated with a user, the content request requesting content from a network destination not associated with the financial institution. The instructions also cause the processor to determine if the network destination is associated with a trusted entity based on the information stored in the network database. The instructions also cause the processor to determine that the requested content includes at least one field into which the user may input sensitive information. The instructions also cause the processor to transmit, by the network interface, substitution content to the user computing device responsive to determining that the network destination is not associated with a trusted entity and to determining that the requested content includes at least one field into which the user may input sensitive information, the substitution content including at least one prompt requesting the user to input sensitive information. The instructions also cause the processor to receive, by the network interface, a user input, the user input containing sensitive information regarding the user. The instructions also cause the processor to transmit, by the network interface, a modified input to the network destination, the modified input comprising undecipherable information. The instructions also cause the processor to transmit, by the network interface, an alert to the user computing device, the alert informing the user that the network destination from which the content was requested is illegitimate.

Another embodiment relates to a computer-implemented method. The method includes receiving, by a financial institution computing system associated with a financial institution, a content request from a user computing device associated with a user, the content request requesting content from a network destination not associated with the financial institution. The method also includes determining, by the financial institution computing system, if the network destination is associated with a trusted entity based on information stored at a network destination database associated with the financial institution computing system. The method also includes determining, by the financial institution computing system, that the requested content includes at least one field into which the user may input sensitive information. The method also includes transmitting, by the financial institution computing system, substitution content to the user computing device responsive to determining that the network destination is not associated with a trusted entity and to determining that the requested content includes at least one field into which the user may input sensitive information, the substitution content including at least one prompt requesting the user to input sensitive information. The method also includes receiving, by the financial institution computing system, a user input, the user input containing sensitive information regarding the user. The method also includes transmitting, by the financial institution computing system, a modified input to the network destination, the modified input comprising undecipherable information. The method also includes transmitting, by the financial institution computing system, an alert to the user computing device, the alert informing the user that the network destination from which the content was requested is illegitimate.

Another embodiment relates to a non-transitory computer readable media having computer-executable instructions embodied therein that, when executed by a processor of a financial institution computing system associated with a financial institution, cause the processor to perform various operations. The operations include receiving a content request from a user computing device associated with a user, the content request requesting content from a network destination not associated with the financial institution. The operations further include determining if the network destination is associated with a trusted entity based on information stored at a network destination database associated with the financial institution computing system. The operations further include determining that the requested content includes at least one field into which the user may input sensitive information. The operations further include transmitting substitution content to the user computing device responsive to determining that the network destination is not associated with a trusted entity and to determining that the requested content includes at least one field into which the user may input sensitive information, the substitution content including at least one prompt requesting the user to input sensitive information. The operations further include receiving a user input from the user computing device, the user input containing sensitive information regarding the user. The operations further include transmitting a modified input to the network destination, the modified input comprising undecipherable information. The operations further include transmitting an alert to the user computing device, the alert informing the user that the network destination from which the content was requested is illegitimate.

DETAILED DESCRIPTION

Figure 1:
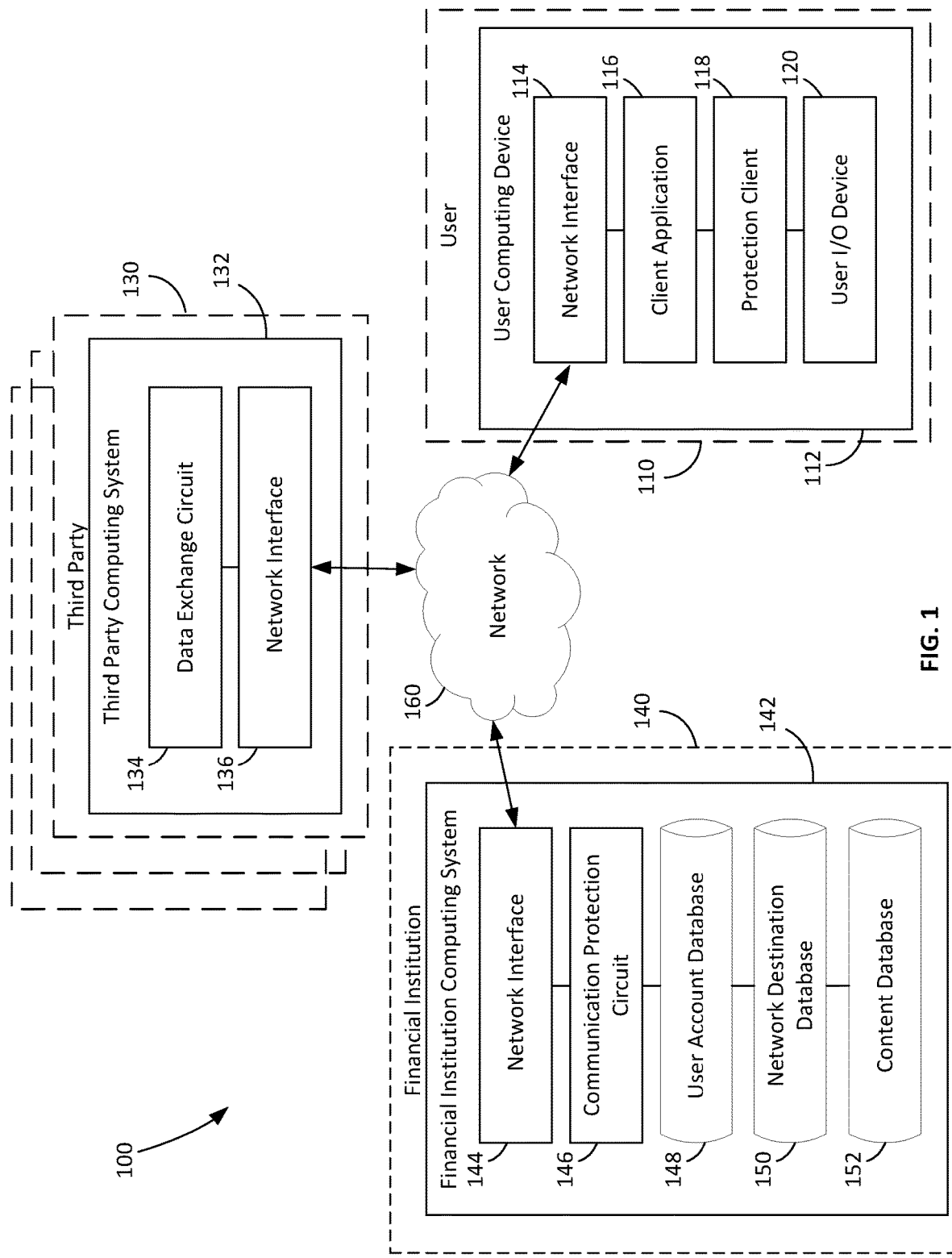
FIG. 1 is a block diagram of an information protection system, according to an example embodiment.

Referring generally to the figures, various systems, methods, and apparatuses for preventing the transmittal of sensitive user information to untrusted entities through an information protection system are described herein. More particularly, systems and methods for preventing the communication of sensitive user information via a virtual sandbox are described herein.

In various example embodiments, a separate computing system acts as a proxy or intermediary for the user when the user requests information from various other entities over a network via a user computing device. For example, if a user selects a hyperlink to a webpage so as to initiate communications with an external entity, the separate computing system performs various actions to verify the legitimacy of the external entity such as cross-referencing the hyperlink against a list of known fraudulent hyperlinks stored in a database. Additionally, the separate computing system may also determine if the hyperlink leads to a webpage that requests the user to provide sensitive information. In various arrangements, if the separate computing system determines that the external entity is not a legitimate entity and that the user-requested content involves the transmittal of sensitive user information, the separate system transmits virtual sandbox content to the user computing device. The virtual sandbox content may mimic the requested content and also request sensitive user information from the user. Upon the user's submittal of sensitive information into the sandbox content, the separate computing system may encrypt the user-entered information using an undecipherable key and transmit the encrypted user-entered information to the external entity. The encrypted user-entered information may include a request for the external entity to prove its identity to the separate computing system. Additionally, the separate computing system may transmit an alert to the user explaining that such sensitive information should not be entered when communicating with an untrusted data source. As a result of these steps, the user is prevented from providing sensitive information to untrusted entities and is educated about steps to take to prevent such occurrences in the future.

As used herein, the term "sensitive information" refers to any data descriptive of any attribute of a user that may potentially be used by any entity. Examples of sensitive information may include, in addition to other things, a user's name, address, phone number, e-mail address, social security number, driver's license number, and payment account information.

As used herein, the term "virtual sandbox content" refers to content that serves as a substitute for original content requesting information from a user. Virtual sandbox content may take a variety of forms. For example, virtual sandbox content may be in the form of webpages, automated voice messages, text messages, push notifications, e-mail messages, and the like. As such, virtual sandbox content may also include modified forms of original content.

The embodiments described herein solve the technical and internet-centric problem of preventing users from providing sensitive information to untrusted entities. This is done by transmitting encrypted user data to the external entity rather than the actual sensitive information received from the user. Additionally, by transmitting mimicked content to the user that also requests sensitive user information, the systems and methods disclosed herein assemble datasets on user entry of sensitive information. Further, because users go through the process of actually entering sensitive information into the virtual sandbox content prior to receiving an alert, user behavior is accurately monitored and users are better educated to avoid performing such a process in the future.

Referring now to FIG. 1, a block diagram of an information protection system 100 is shown, according to an example embodiment. As will be described below, the information protection system 100 prevents a user 110 from providing sensitive user information to certain third party entities 130. The information protection system 100 includes a user computing device 112 associated with a user 110, a third party computing system 132 associated with a third party 130, and a financial institution computing system 142 associated with a financial institution 140, whereby these components are communicably coupled to one another over the network 160. The network 160 provides communicable and operative coupling between the user computing device 112, the financial institution computing system 142, and other components disclosed and described herein to provide and facilitate the exchange of communications (e.g., data, instructions, messages, values, commands). The network 160 is a data exchange medium, which may include wireless networks (e.g., cellular networks, Bluetooth®, WiFi, Zigbee®), wired networks (e.g., Ethernet, DSL, cable, fiber-based), or a combination thereof. In some arrangements, the network includes the Internet.

The user 110 is an entity (e.g., individual, organization, computing system) desiring to access content provided by a third party 130. For example, the user 110 may be an individual attempting to access a uniform resource locator (URL) associated with a server (e.g., third party computing system 132) associated with a third party 130 via a web browser. The third party 130 is an entity (e.g., individual, organization, computing system) providing content that is accessible to the user 110. For example, the third party 130 sends a hyperlink to the user 110 via an e-mail message. Accordingly, the third party 130 may operate a web server that provides webpages to the user 110 in response to receiving a user request for content. The third party 130 includes trusted and untrusted entities.

The financial institution 140 is an entity that, in some arrangements, acts as an intermediary in the communications between the user 110 and the third party 130. For example, if the user 110 transmits a request for content from the third party 130, such a request may first be relayed to the financial institution 140 for processing by the methods disclosed herein. The financial institution 140 may include commercial or private banks, credit unions, investment brokerages, or the like. While the embodiments illustrated in the figures illustrate the intermediary as a financial institution, it should be understood that any type of entity or system may serve as the intermediary in accordance with the systems and methods disclosed herein.

The user computing device 112 is a computing device associated with the user 110. The user computing device 112 may be any type of computing device that may be used to send and receive information over the network 160. In this regard, the user computing device 112 may include any wearable or non-wearable device. Wearable devices refer to any type of device that an individual wears including, but not limited to, a watch (e.g., smart watch), glasses (e.g., eye glasses, sunglasses, smart glasses), bracelet (e.g., a smart bracelet), etc. User computing device 112 may also include any type of mobile device including, but not limited to, a phone (e.g., smart phone), tablet, personal digital assistant, and/or computing devices (e.g., desktop computer, laptop computer, personal digital assistant).

In the example embodiment shown, the user computing device 112 includes a network interface 114 enabling the user computing device 112 to exchange information over the network 160, a client application 116, a protection client 118, and a user input/output ("I/O") device 120. The user I/O device 120 includes hardware and associated logics configured to enable the user computing device 112 to exchange information with the user 110. An input device or component of the user I/O device 120 allows the user 110 to provide information to the user computing device 112, and may include, for example, a mechanical keyboard, a touchscreen, a microphone, a camera, a fingerprint scanner, any user input device engageable with the user computing device 112 via a USB, serial cable, Ethernet cable, and so on. An output device or component of the user I/O device 120 allows the user 110 to receive information from the user computing device 112, and may include, for example, a digital display, a speaker, illuminating icons, LEDs, and so on.

The client application 116 is structured to communicably couple the user computing device 112 with various other computing systems via the network 160. In some arrangements, the client application 116 constitutes a web browser hard coded into the memory of the user computing device 112 including executable instructions that cause user computing device 112 to communicate with various backend server systems via a communications protocol (e.g., the HTTP protocol). As such, the client application 116 may present the user with various displays enabling the user 110 to input a desired network destination from which to receive content and displays including the received content. Further, the client application 116 may include various fraud prevention modules. For example, the client application 116 may include a list of trusted certificate authorities as well as a processing algorithm configured to determine if digital certificates received from various third parties 130 were issued by any of the trusted authorities. All known security measures in standard web browsers may be included.

In some arrangements, the client application 116 constitutes an application configured to cause the user computing device 112 to communicate with a specific computing system over the network 160. For example, the client application 116 may include an e-mail application whereby the user 110 is able to view various messages sent to the user 110 by various other parties. In such cases, the client application 116 may include a widget or the like that enables the user to request content from various third parties 130. For example, a user e-mail may include a hyperlink to a web page provided by a third party 130. Upon selection of the hyperlink by the user 110 the client application 116, similar to a web browser, may transmit a content request to receive the web page from the third party 130 and, upon receipt of the web page, render the web page viewable from within the client application 116. The client application 116 includes any mechanism through which the user 110 may request content from a third party 130 over the network 160.

The protection client 118 is structured to communicably couple the client application 116 to the financial institution computing system 142. As such, the protection client 118 may include a plugin to the client application 116. Alternatively, the client application 116 may be a standalone application on the user computing device 112 and include, for example, an application programming interface (API) or the like that is configured to facilitate the integration of the protection client 118 with the client application 116. In various embodiments, the protection client 118 causes the user computing device 112 to redirect any requests for content from third parties 130 to the financial institution computing system 142. In other words, the protection client 118 causes the financial institution computing system 142 to become a proxy server for the user computing device 112 whereby the financial institution computing system 142 can perform various operations to prevent certain content from being received by the user computing device 112 by the methods described below.

In some arrangements, the protection client 118 performs an initial analysis on any requests for content made by the user 110. For example, the protection client 118 may include various datasets maintained in a network destination database 150 at the financial institution computing system 142. As will be described below, such datasets may catalogue various network destinations (e.g., domain names, websites, IP addresses) that are trusted or known to be fraudulent by the financial institution 140. In some arrangements, such data may be transmitted to the user computing device 112 when the protection client 118 is initially installed by the user 110 on the user computing device 112. In any event, upon the user 110 providing an input to the client application 116 to request information from a third party computing system 132 over the network 160 (e.g., by clicking a hyperlink or by inputting a URL), the protection client 118 is configured to cross reference the content request against the datasets to determine if the request is for content is from a trusted or fraudulent source. In some arrangements, upon making such a determination, a notification signal indicating the determination may be transmitted to the financial institution computing system 142.

In some arrangements, upon determining that the content request is for content from a fraudulent third party 130, the protection client 118 may nevertheless request the content via the network 160 and, upon the user computing device 112 receiving such content, perform an initial analysis on the content to determine if the received content requests sensitive information from the user 110. For example, the protection client 118 may parse any received HTML, content to identify any information being requested from the user. In response to making such a determination, the protection client 118 itself may retrieve virtual sandbox content from, for example, a storage unit of the user computing device 112 to present to the user. In such embodiments, the virtual sandbox content, which may be similar in form to the content stored in the content database 152 described below, may be transmitted to the user computing device 112 when the protection client 118 is installed by the user 110. As described below, the sandbox content may request various forms of sensitive information from the user 110. Upon the user 110 entering the requested information, the protection client may scramble (e.g., encrypt) the entered information so as to render it indecipherable and transmit the scrambled information to the third party computing system 132. Further, after performing such a process, the protection client 118 may further present an alert to the user 110 notifying the user 110 that sensitive information was almost transmitted to a fraudulent entity.

In various embodiments, the third party computing system 132 includes a backend server system configured to direct content (e.g., in the form of webpages and the like) to various requesting computing devices (e.g., the user computing device 112 and/or financial institution computing system 142). As shown, the third party computing system 132 includes a network interface 136 enabling the third party computing system 132 to exchange data over the network 160 and a data exchange circuit 134. The data exchange circuit 134 is configured to selectively retrieve content stored at the third party computing system 132 to fulfill various content requests received from requesting computing devices over the network 160. For example, in some arrangements, when a user 110 transmits a content request to the third party computing system 132 via the user computing device 112, the data exchange circuit 134 establishes a connection with the user computing device 112 via any established protocol (e.g., the TCP/IP protocol). The data exchange circuit 134 may exchange digital credentials (e.g., digital certificates and encryption keys) with the user computing device 112 to establish a secure communication channel with the user computing device 112 over the network 160. Once the secure communication channel is established, the data exchange circuit 134 selectively retrieves datasets stored at the third party computing system 132 either based on the initial content request received from the user computing device 112 (e.g., if the initial content request contains a file path) or transmits a default webpage (e.g., a homepage) to the user computing device 112. Additional, more specific content requests received from the user computing device 112 may be fulfilled (e.g., generated based on user interactions with the default webpage) via the established secure channel.

The financial institution computing system 142 includes a network interface 144 enabling the financial institution computing system 142 to exchange data over the network 160, a communication protection circuit 146, a user account database 148, a network destination database 150, and a content database 152.

The user account database 148 is a storage device structured to retrievably store user information relating to the various operations discussed herein, and may include non-transient data storage mediums (e.g., local disc or flash-based hard drives, local network servers) or remote data storage facilities (e.g., cloud servers). The account database 148 includes personal user information (e.g., names, addresses, phone numbers), identification information (e.g., driver's license numbers, standard biometric data), and user financial information (e.g., token information, account numbers, account balances, available credit, credit history, transaction histories). In some embodiments, the account database 148 stores any of the previously discussed information as it relates to the user 110, as the user may hold an account at the financial institution 140. In some embodiments, the user database 148 includes information regarding a caretaker or guardian of the user 110. For example, the user database may store information regarding a computing device (similar to the user computing device 112) belonging to the guardian (e.g., a phone number or IP address). In some embodiments, the guardian is provided control over the third parties 130 to which the user 110 provides sensitive information. As such, any of the alerts described herein may also be transmitted to the guardian's computing device.

The network destination database 150 is structured to retrievably store information pertaining to various third parties 130 and associated computing systems 122. The network destination database 150 may include non-transient data storage mediums (e.g., local disc or flash-based hard drives, local network servers, and the like) or remote data storage facilities (e.g., cloud servers). In some arrangements, the network destination database 150 stores information regarding various network destinations (e.g. a list of particular URLs, server addresses, and/or webpage attributes) that have been determined to be fraudulent or legitimate. For example, the communication protection circuit 146 may access any known data sources (e.g., forums, various fraud prevention services, user reports, and the like) to identify a list of known fraudulent network destinations. Such a list may be maintained as a dataset in the network destination database 150. Additionally, the network destination database 150 may also include a listing of trusted network destinations. For example, if a particular third party 130 is a customer of the financial institution 140, the financial institution 140 may include information pertaining to any URLs or file paths associated with that particular third party 130.

In some embodiments, the network destination database 150 may also store various attributes associated with any known fraudulent content. For example, a particular third party 130 engaging in a fraudulent scheme to extract sensitive information from various users 110 may frequently change the URL used to perform such a scheme, but deliver similar content to various users. Accordingly, upon learning that a particular fraudulent webpage requests sensitive information (e.g., a customer of the financial institution 140 may report a fraudulent transaction performed using stolen account information, and identify the website), the communication protection circuit 146 may access such a web page and extract information describing various aspects of the fraudulent webpage. The information may describe, for example, the identity of any sensitive information requested from the user 110, the arrangement of the various fields into which the user 110 is directed to input the sensitive information, a webpage coloring scheme, the placement of a logo or other graphical element, a title or name of the website, and the like.

The content database 152 is structured to retrievably store content that is to be transmitted to the user 110. The content database 152 may include non-transient data storage mediums (e.g., local disc or flash-based hard drives, local network servers, and the like) or remote data storage facilities (e.g., cloud servers). In various arrangements, the content database 152 includes content that is viewable via the client application 116 on the user computing device 112. Accordingly, in arrangements where the client application 116 is a web browser, the content database 152 may store various webpages that may be transmitted to the user computing device 112 over the network 160. In various arrangements, the content may be specifically configured as virtual sandbox content. As such, the webpages request various forms of sensitive information (e.g., addresses, bank account numbers, social security numbers, and the like) from the user 110. In some arrangements, the content database 152 includes a plurality of pre-generated web pages including varying amounts of information and requesting various amounts of sensitive information from the user 110.

In some arrangements, the content database 152 includes various web-page templates and various graphics that can be used to populate the template to generate a web-page to be transmitted to the user 110. For example, a particular webpage may include a first portion including various fields that request various forms of sensitive information from the user 110. The webpage may include additional portions into which various graphics or messages may be inserted. As such the webpage may be customized to mimic any content received from third party computing systems 132. For example, the communication protection circuit 146 may copy a message included in content received from a third party computing system 132 and insert the message into a portion of the webpage. Similar procedures may be followed for various other aspects of the received webpage (e.g., graphics, color schemes, and the like).

In some arrangements, the content database 152 may include content used by the communication protection circuit 146 to transmit alerts to the user 110 or individuals associated with the user 110. For example, in one embodiment, the content database 152 includes various alert webpages. Each alert webpage may include an alert message. The alert message may include content that notifies the user 110 of the dangers of sharing sensitive user information with unfamiliar entities. Further, the alert messages may include various fields that can be populated with data pertaining to the particular circumstance of the user 110. For example, the message may include a URL field in which a particular URL that the user 110 attempted to access can be inserted. Similar other fields may be populated by various other aspects of the web content requested by the user 110 such as logos, web-page characteristics (e.g., coloring schemes, entity names included on the webpage, a fraud indicator of the web-page, and the like). This way, the user 110 may be informed so as to avoid requesting such content again in the future.

The communication protection circuit 146 is structured to perform various operations to prevent the user from providing sensitive information to an untrusted third party 130. Accordingly, the communication protection circuit 146 is configured to receive any requests for content from the third parties 130 made by the user 110 by way of the client application 116. For example, when the user 110 installs the protection client 118 on the user computing device 112, the communication protection circuit 146 may establish a communication node with the protection client 118 on user computing device 112 such that, whenever user content requests are transmitted to the financial institution computing system 142 by way of the protection client 118, the communication protection circuit 146 initiates a process to perform various checks before directing the requested content to the user 110.

Initially, the communication protection circuit 146 may perform various checks that are similar in nature to those performed by a web browser. For example, the communication protection circuit 146 may establish a connection with the third party computing system 132, exchange various keys, receive digital certificates, and perform various checks on the certificates to perform an initial check of the authenticity of the associated third party 130. For example, the communication protection circuit 146 may identify a certificate authority that issued any digital certificates received from the third party computing system 132 and cross reference the identified authority with a list of known trusted authorities (e.g., stored in the network destination database 150). Additionally, the communication protection circuit 146 may also check various entries on the certificate (e.g., that the certificate was actually issued to the URL that the user 110 is attempting to access, and the like) to ascertain the authenticity of the third party 130. In some embodiments, if the initial checks reveal that the requested content is fraudulent (e.g., if a digital certificate is invalid), the user 110 may be denied access to the requested content and/or a warning message may be transmitted to the user computing device 112.

After performing such initial checks, the communication protection circuit 146 may itself transmit a content request to the third party computing system 132. Upon receipt of the content, the communication protection circuit 146 may parse the content and determine if the received content requests any form of sensitive information from the user 110. For example, the communication protection circuit 146 may run an analysis on the received content to identify any common field names contained on web pages that request sensitive information. Such field names may identify a piece of sensitive information requested from the user 110. For example, a particular webpage requesting sensitive information from the user 110 may include a field name "social security number" next to a field into which such information may be entered. Thus, by searching the received content for such field names, the communication protection circuit 146 may determine if sensitive information is being requested.

If it is determined that the content requested by the user 110 requests sensitive information from the user 110, additional checks may be performed on the requested content to ascertain the authenticity of the third party 130. In some embodiments, the communication protection circuit 146 cross references various aspects of the received content with content stored in the network destination database 150. For example, the communication protection circuit 146 may cross-reference the URL, IP address, or file path associated with the received content with various blacklists and whitelists maintained in the network destination database 150. The blacklists may list URLS/addresses/paths that have been associated with fraudulent schemes in the past. Such data may be continuously updated by the communication protection circuit 146 based on recent reports of fraudulent schemes. The whitelists may include similar list associated with entities trusted by the financial institution 140. For example, the whitelists may include URL's associated with entities that are customers of the financial institution 140.

In some arrangements, if the communication protection circuit 146 cannot ascertain the trustworthiness of the third party 130 via accessing the blacklists or whitelists included in the network destination database 150, additional checks may be performed on the received content. For example, the communication protection circuit 146 may identify various characteristics contained in the received webpage (e.g., logos, color schemes, company name placements, placements of other graphics, and the like). For a particular characteristic, the communication protection circuit 146 may run a comparison of the identified characteristic with that of other web-pages identified as being associated with fraudulent entities. For example, if the communication protection circuit 146 identifies that a particular webpage includes a particular logo (e.g., associated with a particular entity or a particular name) at a particular location, the communication protection circuit 146 may access the network destination database 150 and identify other webpages identified as being fraudulent that include the same logo (such information may, for example, be contained in lookup tables identifying various logos and identifying the particular logos contained at each webpage). If the logo is contained on a fraudulent site, the communication protection circuit 146 may compare the identified location information of each of the web pages. If the logo location on the received content matches that of the fraudulent webpage, the received content may be identified as fraudulent. Similar analysis may be performed for various other characteristics of the received content.

Further, the communication protection circuit 146 may check the received content for various fraud indicators. Fraud indicators may be attributes commonly associated with fraudulent websites such as misspelled domain names, mismatches between domain names and webpage titles or company names contained in the webpage, the absence of a webpage title, certain messages contained in the received content (e.g., indicating that the user 110 has won a reward), and the like. Accordingly, the communication protection circuit 146 may perform an analysis on the received web content to identify any such inconsistencies or other fraud indicators.

In some arrangements, if the received content passes any or all of the above described fraud checks, the communication protection circuit 146 may enable the user access to requested content. In some arrangements, the communication protection circuit 146 relays the received content to the user computing device 112. Alternatively, the communication protection circuit 146 may transmit a legitimacy indication to the user computing device 112 which may enable the user computing device 112 to transmit a content request to the third party computing system 112 to receive the requested content. In such arrangements, if, for example the communication protection circuit 146 identified the third party 130 as a trusted entity (e.g., as a customer of the financial institution 140 or the like), such a legitimacy notification may also cause a notification to be displayed to the user 110 on the client application 116. The notification may be viewable simultaneously with any content received from the third party computing system 132, and identify the third party as a trusted entity. Further, the notification may also be configured to receive a user preference to enter the requested information. In response to receiving such a preference, the communication protection circuit 146 may act on the user 110's behalf to provide the requested information to the third party 130. For example, the communication protection circuit 146 may retrieve the requested information (e.g., the user 110's name, address, social security number, payment account information, and the like) and transmit the retrieved content back to the third party computing system 132, thereby completing any transactions proposed by the received content. Thus, the user 110 avoids the hassle of entering the requested information. Further, because the information is automatically populated, user entry errors are beneficially avoided.

However, if the content received from the third party computing system 132 fails any or all of the above tests performed by the communication protection circuit 146, the communication protection circuit 146 may perform various actions to protect sensitive user information. For example, the communication protection circuit 146 may selectively retrieve virtual sandbox content from the content database 152 for transmittal to the user. In this regard, the communication protection circuit 146 may identify the information requested from the user 110 by the received content. For example, the communication protection circuit 146 may identify various field names included in the received content (e.g., by performing a textual search of the received content for various terms such as "SSN," "account number," "address," and the like). Upon identifying the information that is requested, the communication protection circuit 146 may identify a webpage or the like stored at the content database 152 that requests the same or similar information from the user 110. The selection may also be based on other characteristics of the received content. For example, if the received content has a red background, the communication protection circuit 146 may retrieve a webpage also having a red background.

Alternatively, instead of retrieving substitute content from the content database 152 to deliver to the user 110, the communication protection circuit 146 may modify the content received from the third party computing system 132. For example, the communication protection circuit 146 may place an identifier or a tag on the received web content prior to transmitting the content to the user computing device 112. Such a tag may not be visible to the user, but may cause the communication protection circuit 146, upon re-receiving the content after the user 110 enters the requested information, to scramble the user-input information prior to relaying the content back to the third party computing system 132. Similar operations may be performed on any information input by the user 110 into the virtual sandbox content transmitted to the user 110. This way, the user 110 is prevented from providing sensitive information to an untrusted entity. Further, by going through the process of providing virtual sandbox content to the user 110 and receiving user responses including sensitive information, the systems and methods disclosed herein enable the collection of useful data regarding various schemes through which wrongdoers seek to collect sensitive information.

Figure 2:
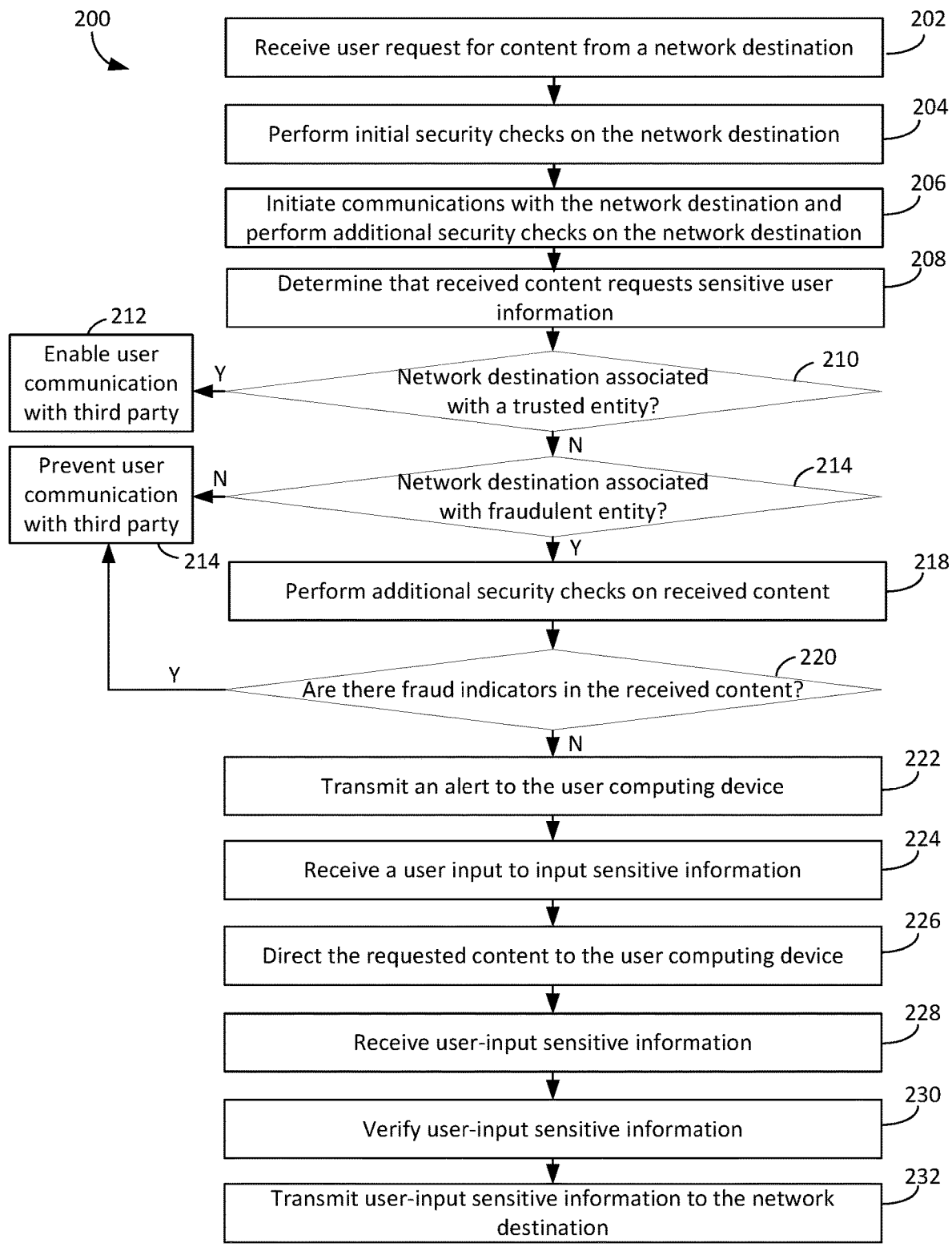
FIG. 2 is a flow diagram of a method of verifying the authenticity of a request for sensitive user information, according to an example embodiment.

Referring now to FIG. 2, a flow diagram of a method 200 of verifying the authenticity of a request for sensitive user information is shown, according to an example embodiment. In various embodiments, the method 200 is performed by the components shown in FIG. 1 such that reference may be made to the components of FIG. 1 to aid the description of the method 200.

A user request for content from a network destination is received at 202. In some arrangements, the user request for content is received by the network interface 144 of the financial institution computing system 142. For example, a user may encounter a hyperlink while accessing a webpage via the client application 116 and select the hyperlink to cause the client application 116 to formulate a request for content from a network destination associated with a third party computing system 132. However, the user computing device 112 may have a protection client 118 implemented thereon or the client application 116 may be configured such that the request is directed to the financial institution computing system 142 rather than the third party computing system 132. The request for content may include a URL associated with the hyperlink.

Initial security checks are performed on the network destination at 204. In some embodiments, the communication protection circuit 146 performs initial security checks based on information contained in the received content request. For example, if the request for content includes a URL, the communication protection circuit 146 may cross-reference the URL or parts thereof (e.g., domain name, file path, and the like) against a list of various known fraudulent URLs or URL components. Further, the communication protection circuit 146 may initiate a sequence to retrieve a network address (e.g., an IP address) associated with the network destination, and cross reference the retrieved address against a list of addresses associated with fraudulent actors.

Communications with the network destination are initiated and additional security checks are performed at 206. In some embodiments, the communication protection circuit 146 replicates the request for content received at 202 and transmits the request to the third party computing system 132 over the network 150 via the network interface 144. For example, the communication protection circuit 146 may establish a transmission control protocol (TCP) connection with the network destination and exchange digital certificates with the third party computing system 132. The communication protection circuit 146 may identify the third party 130 associated with the third party computing system 132 based on the received digital certificate, and cross-reference the third party 130 against a list of known fraudulent entities stored in the network destination database 150. Additional checks may be performed on the digital certificates (e.g., the issuing entity, cross-referencing of the URL listed on the certificate to the URL selected by the user 110, and the like). In various arrangements, if these additional security checks are met, encryption keys are exchanged and the content requested by the user 110 is received at the financial institution computing system 142.

It is determined if the received content requests sensitive information from the user at 208. In some embodiments, the communication protection circuit 146 assesses content received from the third party computing system 132 to determine if the received content prompts the user 110 to input sensitive information. For example, the communication protection circuit 146 may perform an analysis on the content received from the third party computing system 132 to determine if it includes field names describing various forms of sensitive user information. If the received content otherwise passes the initial security checks and does not request sensitive information from the user 110, the content is relayed to the user computing device 112 over the network 160.

It is determined if the network destination is associated with a trusted entity at 210. In some embodiments, the communication protection circuit 146 cross references the received content against information stored in the network destination database 150 to determine the trustworthiness of the third party 130. As discussed above, the network destination database 150 may include a list of URLs, and entity names that are trusted by the financial institution 140. Accordingly, the communication protection circuit 146 may identify the third party 130 associated with the third party computing system 132 (e.g., based on a digital certificate received at 208 from a trusted certificate authority) and compare the third party 130 with the list of trusted entities contained in the network destination database 150. If the communication protection circuit 146 determines that the third party 130 is a trusted entity, the method 200 may advance to 212 and facilitate completion of a secured communication between the user 110 and the third party 130 (shown in FIG. 3).

If, however, the third party 130 is not a trusted entity, it is determined if the network destination is associated with a fraudulent entity at 214. In some embodiments, the communication protection circuit 146 cross references the received content against information stored in the network destination database 150 to determine the trustworthiness of the third party 130. In various arrangements, the communication protection circuit 146 cross-references the information received from the third party computing system 132 with various databases of URL blacklists and fraudulent entity names maintained at the network destination database 150. If the communication protection circuit 146 determines that the third party 130 is a fraudulent entity, the method 200 may advance to 216 and prevent the user from providing sensitive information to the third party 130 (shown in FIG. 4).

If the classification of the third party 130 is still unknown after 214, however, additional security checks on the received content may be performed at 218. In some embodiments, the communication protection circuit 146 parses the content received from the third party 130, identifies various characteristics of the contents received from the third party 130, and assesses the identified characteristics to determine if any fraud indicators are present. For example, the communication protection circuit 146 may compare the domain name in the URL entered by the user 110 with a title of the received webpage. Oftentimes, a mismatch between the two may be an indication that the received content is fraudulent. Additionally, the communication protection circuit 146 may identify a color scheme of the received content (e.g., a percentage that bears a particular color) and compare the color scheme with those of various other webpages that were previously determined to be fraudulent. Images contained in the received content may also be cross-referenced with other aspects of the received content (e.g., a logo may be cross-referenced with a written corporate name on the webpage). Further, the communication protection circuit 146 may further assess the words contained in the received content to identify the reason why sensitive information is being requested. For example, a received webpage may include a descriptive paragraph describing a product or service to be provided to the user 110 in exchange for the user 110 inputting sensitive information. Certain keywords (e.g., "free" or "reward") in such a paragraph may be fraud indicators.

It is determined if the received content includes any additional fraud indicators at 220. In some embodiments, the communication protection circuit 146 assesses additional identified characteristics of the received content for additional fraud indicators. For example, if a coloring scheme of the received webpages matches that of another webpage previously determined to be fraudulent, the received content may be identified as including a fraud indicator. A fraud indicator may include any of the inconsistencies (e.g., in spelling) discussed above or any similarity with webpages previously determined to be fraudulent. If the communication protection circuit 146 identifies any fraud indicators, the method 200 may advance to 216 and proceed as if the third party 130 were identified as fraudulent at 214.

In some embodiments, if there are no fraud indicators in the received content, an alert is transmitted to the user computing device 112 at 222. In some embodiments, the communication protection circuit 152 generates the alert using content stored in the content database 152 and causes the alert to be transmitted to the user computing device 112 over the network 160 via the network circuit 160. The alert may be viewable by the user via the client application 116 on the user computing device 112. The alert may indicate to the user that the third party 130 is not a trusted entity and is requesting sensitive information from the user 110. The alert may request an input from the user to indicate a user preference to still enter sensitive information despite the third party 130 not being a trusted entity. In some embodiments, the alert may be transmitted to a computing device associated with a caretaker or other individual having a relationship to the user 110 (e.g., a spouse, an individual pre-identified by the user 110, or the like) rather than the user computing device 112. In such embodiments, the alert may also include a URL to the received content, enabling the caretaker to view the received content and assess its validity. As such, the caretaker or other individual may control the user's ability to input sensitive information to untrusted third parties 130. Additionally, another alert may be transmitted to the user computing device 112 indicating to the user 110 that permission from the caretaker is being sought.

It should be noted that, in some embodiments, the financial institution computing system 142 skips steps 222-232 when no fraud indicators are found on the received content. In such embodiments, if the third party 130 is found not to be a trusted entity at 210, the method 200 simply advances to step 216 and performs the method 400 described below.

A user input indicating a user preference to enter the sensitive information is received at step 224. In some embodiments, the communication protection circuit 146 receives the user input via the network interface 144. For example, the user 110 or other individual associated therewith may interact with the alert to provide such an input, causing a signal to be transmitted to the financial institution computing system 142 over the network 160.

In response to such an input, the requested content is directed to the user computing device 112 at 226. In some embodiments, the communication protection circuit 148 directs the content received from the third party 130 at 206 to the user computing device 112. In response, the user 110 may input the requested information and interact with the received content (e.g., by pushing a "submit" button or the like) to indicate a preference to transmit the input information to the third party 130. In response, the protection client 118 may redirect the user-input information to the financial institution computing system 142. Accordingly, user-input sensitive information is received at 228.

The user-input sensitive information is used to verify the user 110 at 230. In some embodiments, the communication protection circuit 146 cross references the user-input sensitive information with information stored in the account database 148. If the user-input information matches that stored in the account database 148, the user 110 may be verified, and the user-input information may be transmitted to the network destination at 232. As such, the user 110 is able to complete the desired transaction.

Figure 3:
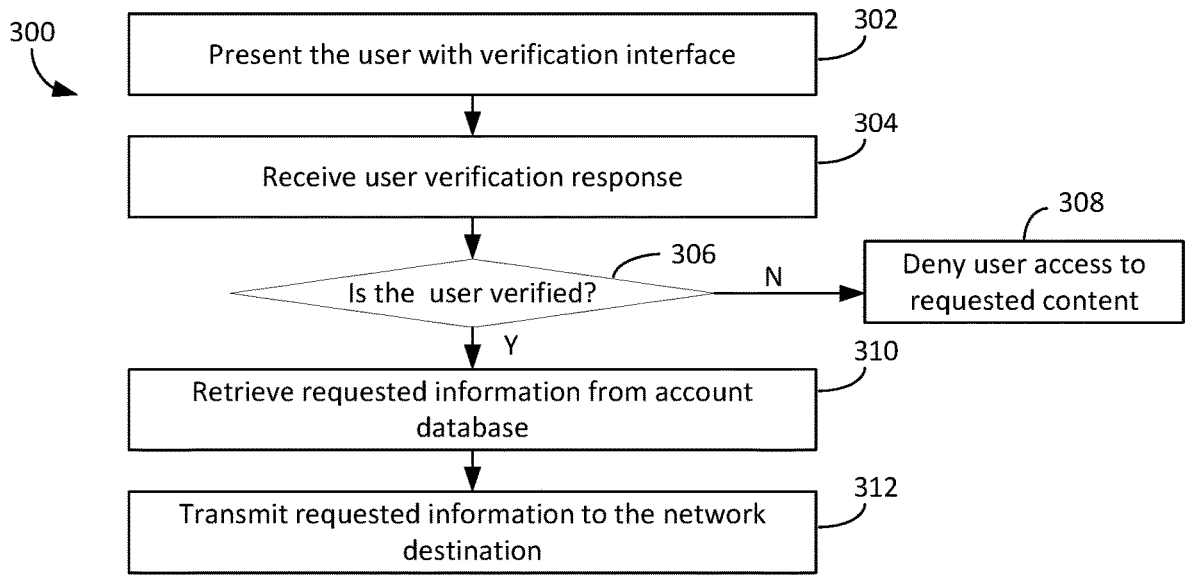
FIG. 3 is a flow diagram of a method of facilitating the user providing sensitive user information to a trusted entity, according to an example embodiment.

Referring now to FIG. 3, a method 300 of facilitating the user 110 providing sensitive user information to a trusted entity is shown, according to an example embodiment. In various embodiments, the method 300 is an extension of the method 200 discussed above in relation to FIG. 2 (e.g., at step 212). For example, as discussed above, the method 300 may be performed responsive to the communication protection circuit 146 identifying that the network destination (e.g., the URL or the like) from which the user 110 is requesting content is associated with a trusted entity. For example, if the user 110 is requesting a specific webpage that has been predesignated by the financial institution 140 as being legitimate (e.g., in the network destination database 150), the method 300 may be initiated. As will be described below, the method 300 enables the communication protection circuit 146 to provide the sensitive user information to trusted entities on behalf of the user 110. As such, prior to performing such an action, it is desirable to verify that the user 110 is actually requesting the content from the third party 130 via the user computing device 112 rather than someone else.

The user is presented with a verification interface at 302. In some arrangements, the communication protection circuit 146, upon determining that the requested content requests the user 110 to input sensitive information, retrieves a verification interface from the content database 152 and transmits the interface (e.g., as a webpage viewable via the client application 116) to the user computing device 112. The verification interface prompts the user to input information that can be used to verify the user 110. For example, in some embodiments, the verification interface may prompt the user 110 to input online banking credentials associated with a banking website provided by the financial institution computing system 142. In some arrangements, the verification interface may request the user 110 to answer a security question or the like. In some arrangements, the verification interface may request the user 110 to input a portion of the sensitive information requested by the requested content. In some arrangements, the verification interface requests the user 110 to indicate a preference whether the user 110 would like to provide the requested information to the third party 130.

In some arrangements, the verification interface may be viewable simultaneously with the requested content. For example, upon determining that the network destination is associated with a trusted entity (e.g., at the step 210 discussed above in relation to the method 200), the financial institution computing system 142 may direct the requested content as well as the verification interface to the user computing device 112 such that both are viewable to the user via the client application 116. For example, the verification interface may be included on one portion of the display of the user computing device 112, while the requested content may be included on another, separate portion of the display. This way, the user 110 can view the requested content, determine if they would like to input the requested information, and do so by inputting the requested information into the verification interface.

The user's verification response is received at 304. For example, the user 110 may input the information requested by the verification interface and indicate a preference to provide to the third party 130 the requested information by submitting the requested information to the financial institution computing system 142.

Upon receipt of the user 110's verification response, the communication protection circuit verifies the user 110 at 306. For example, if the user inputs a set of online banking credentials into the verification interface, the communication protection circuit 146 may compare the user-input credentials to credentials stored in the user account database 148 to verify the user 110. In another example, the user inputs a set of sensitive user information (e.g., a name, address, spouses name, and the like), the communication protection circuit 146 retrieves such information from the account database 148 and compares the stored information to the user-input information to verify the user. If the user is not verified (i.e., if the user-input information does not match the information stored at the financial institution computing system 142), then the user is denied access to the requested content at 308. As such, the requested sensitive information will not be transmitted to the third party computing system 132. This way, unauthorized individuals who manage to access the user computing device 112 are unable to provide sensitive information to various third parties 130.

If the user 110 is verified, however, the sensitive information being requested by the requested content is retrieved from the account database 148 at 310. As discussed above, the communication protection circuit 146 may identify the sensitive information being requested from the user 110. In various situations, all of the information requested from the user 110 is maintained at the account database 148. Thus, such information can be conveniently retrieved and used to auto-populate the various fields contained in the content received from the third party computing system 132. In some situations, certain information requested from the user 110 may not be stored in the account database 148. In such a case, the communication protection circuit 146 may transmit an information request to the user computing device 112 requesting the missing information from the user, and use any user response to populate the associated field.

The requested information is transmitted to the network destination at 312. Once all of the information that is requested from the user 110 is retrieved and the content received from the third party computing system 132 is populated, the communication protection circuit 146 transmits the requested information back to the third party computing system 132 over the network. Thus, the user 110 is able to efficiently provide sensitive information to trusted entities. Data-entry errors are avoided because the financial institution 140 is able to effectively act as the user 110's intermediary in such transactions. Additionally, since the user 110 must be verified prior to the sensitive information being transmitted, the user's security is further ensured.

Figure 4:
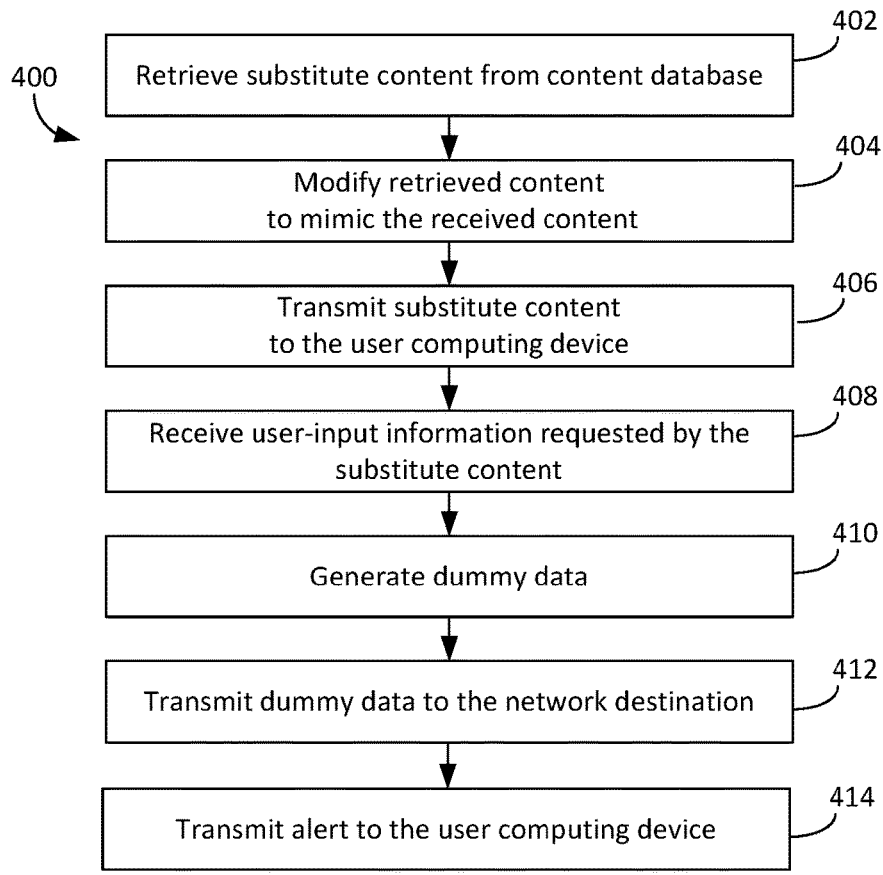
FIG. 4 is a flow diagram of a method of preventing the user from providing sensitive user information to an untrusted entity, according to an example embodiment.

Referring now to FIG. 4, a flow diagram of a method 400 of preventing the user 110 from providing sensitive user information to an untrusted entity is shown, according to an example embodiment. In various embodiments, the method 400 is an extension of the method 200 discussed above in relation to FIG. 2 (e.g., at step 216). For example, as discussed above, the method 400 may be performed responsive to the communication protection circuit 146 identifying that the network destination (e.g., the URL or the like) from which the user 110 is requesting content is associated with a fraudulent entity. For example, if the user 110 is requesting a specific webpage that has been predesignated by the financial institution 140 as being fraudulent (e.g., in the network destination database 150), the method 400 may be initiated.

Substitution content is retrieved from the content database 152 at 402. In various embodiments, if any of the security checks performed on the network destination from which the user 110 requesting content indicate that the third party computing system 132 is associated with a fraudulent entity (e.g., if a URL selected by the user is stored in in a URL blacklist maintained at the network destination database 150), the requested content is not delivered to the user computing device 112. Instead, the communication protection circuit 146 retrieves content stored at the content database 152 to be delivered to the user 110.

In various embodiments, the content retrieved by the communication protection circuit 146 is based at least in part on the content received by the financial institution computing system 142 from the third party computing system 132. For example, the communication protection circuit 146, by any of the methods discussed above, may identify the types of sensitive information that the received content requests from the user. The content retrieved from the content database 152 may be based at least in part on the identified information types being requested. For example, if the communication protection circuit 146 identifies that the third party 130 is requesting the user to input a name, address, phone number, social security number, and bank account number, a pre-constructed webpage also requesting such information may be retrieved from the content database 152.

In some, arrangements, the content retrieved from the content database 152 may be modified to mimic the content received from the third party computing system 132 at 404. For example, the content retrieved at 402 may contain various fields or portions that may be populated with images, messages, and the like that are similar to those included on the content received from the third party computing system 132. Thus, the communication protection circuit 146 may determine that the content received from the third party computing system 132 contains a particular logo and retrieve that logo from the content database 152 for incorporation into the webpage retrieved at 402. Additionally, textual messages contained in the content received from the third party computing system 132 (e.g., a message describing why sensitive information is being requested) may be copied and inserted into the retrieved webpage.

The modified substitute content is transmitted to the user computing device 112 at 406. The substitute content may be viewable as a webpage via the client application 116. As such, the user 110 is presented with a webpage that looks similar to the content that was requested from the third party computing system 132 and also requests sensitive information from the user 110. Thus, the user 110 may enter the requested information and provide an input to the user computing device 112 to submit the requested information to the third party computing system 132.

The user-input sensitive information is received at 408. In some arrangements, responsive to receiving user-input sensitive information, the communication protection circuit 146 may verify the user 110 by performing similar steps as those discussed above in relation to steps 304-306 of the method 300. This way, even though the sensitive information is not going to be transmitted to the third party computing system 222, the communication protection circuit 146 may still determine if unauthorized individuals are attempting to misuse sensitive information. In some arrangements, if the user 110 is not verified, an alert may be transmitted to the user computing device 112 or to a computing device associated with a guardian of the user 110 or the like.

Dummy data is generated at 410. In various embodiments, upon receipt of the sensitive information input by the user 110 into the substitute content, the communication protection circuit 146 scrambles, encrypts, or otherwise replaces the received user-input information. In some embodiments, the user-input information is replaced with strings of random characters. In any arrangement, the user-input information is rendered undecipherable. Such data is used to populate the various fields included in the content received from the third party computing system 132.

The dummy data is transmitted to the third party computing system 132 at 412. For example, upon populating the various fields included in the content received from the third party computing system 132 with the dummy data, the dummy data is transmitted to the network destination from which the user 110 initially requested content. As such, sensitive information is not provided to untrusted entities. Furthermore, upon receipt of such dummy data, the third party computing system 132 may become aware of the fact that fake data has been received from the financial institution computing system 142. To prevent such instances from continuing to happen, the third party 130 may take various steps to prove its authenticity to the financial institution 140. For example, the third party 130 may obtain a digital certificate from a trusted certificate authority, and/or transmit verifiable additional information to the financial institution 140 to prove its identity. In some arrangements, upon the third party 130 taking such steps, the network destination may be classified as legitimate in the network destination database 150.

An alert is transmitted to the user computing device 112 at 414. In various embodiments, the alert may be retrieved from the content database 152 and transmitted to the user computing device 112 over the network 160. The alert may notify the user 110 that sensitive information was almost provided to an untrusted entity. In some arrangements, a plurality of different types of alerts are stored in the content database 152. Each alert may be associated with a different type of scheme designed to extract sensitive information from the user 110. For example, each blacklisted entity, IP address, or URL in the network destination database 150 may also be stored in association with the type a scheme through which the blacklisted item attempts to extract sensitive user information. If a particular URL is associated with a phishing scheme, it may be stored as such in the network destination database 150. Thus, the communication protection circuit 146 may retrieve an alert associated with the scheme type identified to be applicable to the third party computing system 132. The alert may include a set of tips for identifying similar schemes, and the like.

In some arrangements, in addition to be transmitted to the user computing device 112, the alert may also be transmitted to another computing devices associated with another individual. For example, the user 110 may have a guardian or the like that was identified when the user 110 registered for an account at the financial institution 140, or when the user installed the protection client 118 on the user computing device 112. For example, the user 110 may notify the guardian of the program discussed herein, and direct the guardian to install the protection client 118 on a computing device. Upon the guardian doing so, the computing device may be registered at the financial institution computing system 142 and associated with the user 110 such that, whenever the user receives an alert via any of the methods disclosed herein, the guardian also receives such an alert. Thus, if necessary, the user 110 can received additional assistance in avoiding providing sensitive information to untrusted entities.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U. S. C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicably coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A computing system associated with a first entity, the computing system comprising:
a network interface structured to communicate data over a network and receive a content request from a network destination not associated with the first entity, the content request requesting information from a user; and
a processing circuit comprising a memory and a processor, the memory structured to store instructions that are executable by the processor to cause the processor to:
determine if the content request transmitted by the network destination requests sensitive information from the user, wherein determining if the content request requests sensitive information comprises:
transmitting a second content request to the network destination;
receiving content from the network destination responsive to the second content request; and
determining that the received content includes at least one descriptor of sensitive information;
retrieve a substitute webpage from a content database that includes the at least one descriptor of sensitive information;
identify an additional attribute of the received content, the identified additional attribute including at least one of an image contained in the received content or a message contained in the received content; and
modify the retrieved substitute webpage to include the identified additional attribute.

2. The computing system of claim 1, wherein the retrieved substitute webpage is transmitted to the user.

3. The computing system of claim 1, wherein the processing circuit is further configured to determine a validity of the network destination by cross-checking the network destination with network information stored in a network database, wherein the network information indicates whether the network destination is associated with a trusted entity or is a fraudulent network destination.

4. The computing system of claim 1, wherein the processing circuit is further configured to verify user input inputted by the user by comparing the user input with information stored in a user account database structured to store information associated with the user.

5. The computing system of claim 1, wherein the processing circuit is further configured to determine if the content request transmitted by the network destination requests sensitive information from the user by analyzing at least one field into which the user may input information.

6. The computing system of claim 1, wherein the processing circuit is further configured to determine that the network destination is associated with a fraudulent network destination.

7. The computing system of claim 6, wherein the processing circuit is configured to determine if the content request transmitted by the network destination requests sensitive information from the user if the network destination is determined to be associated with the fraudulent network destination.

8. The computing system of claim 1, wherein the substitute webpage comprises a request for sensitive information.

9. The computing system of claim 8, wherein the processing circuit is further structured to:
determine that the network destination is a fraudulent network destination; and
receive the user input responsive to transmitting the substitute webpage to the computing device of the user, the user input including sensitive information responsive to the request for sensitive information in the substitute webpage.

10. The computing system of claim 9, wherein the processing circuit is further configured to generate dummy data responsive to receiving the user input, and transmit the dummy data to the network destination.

11. The computing system of claim 10, wherein the processing circuit generates the dummy data by replacing the sensitive information of the user input with a randomized string of characters.

12. The computing system of claim 1, wherein the image is a logo associated with the network destination.

13. The computing system of claim 1, wherein the first entity is a financial institution.

14. A method, comprising:
receiving, by a computing system of a first entity, a content request from a network destination not associated with the first entity, the content request requesting information from a user;

determining, by the computing system, if the content request transmitted by the network destination requests sensitive information from the user, wherein determining if the content request requests sensitive information comprises:

transmitting a second content request to the network destination;

receiving content from the network destination responsive to the second content request; and determining that the received content includes at least one descriptor of sensitive information;

identifying, by the computing system, an additional attribute of the received content, the identified additional attribute including at least one of an image contained in the received content or a message contained in the received content;

transmitting to the user, by the computing system, a substitute webpage that includes the at least one descriptor of sensitive information and the identified additional attribute.

15. The method of claim 14, further comprising storing, by the computing system, in a network database, network information pertaining to the network destination, wherein the network information indicates whether the network destination is associated with a trusted entity or is a fraudulent network destination.

16. The method of claim 14, further comprising determining, by the computing system, a validity of the network destination by cross-checking the network destination with network information stored in a network database, the network information indicating whether the network destination is associated with a trusted entity or is a fraudulent network destination.

17. The method of claim 14, further comprising storing, by the computing system, in a user account database, information associated with the user.

18. The method of claim 14, further comprising verifying, by the computing system, user input inputted by the user by comparing the user input with information stored in a user account database.

19. The method of claim 14, wherein determining if the content request transmitted by the network destination requests sensitive information from the user comprises analyzing at least one field into which the user may input information.

20. The method of claim 14, wherein the first entity is a financial institution.

\* \* \* \* \*